United States Patent
Harumoto

(10) Patent No.: US 6,939,027 B2
(45) Date of Patent: Sep. 6, 2005

(54) LIGHT SOURCE SYSTEM

(75) Inventor: Yuko Harumoto, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/615,224

(22) Filed: Jul. 8, 2003

(65) Prior Publication Data

US 2004/0066651 A1 Apr. 8, 2004

(30) Foreign Application Priority Data

Jul. 9, 2002 (JP) .................................. 2002-200083
Jun. 18, 2003 (JP) .................................. 2003-173075

(51) Int. Cl.[7] .............................................. F21V 5/04
(52) U.S. Cl. ..................... 362/336; 362/249; 362/244; 362/800
(58) Field of Search ............................ 362/800, 544, 362/545, 475, 507, 538, 227, 230, 231, 236, 240, 334, 347, 350, 361, 249, 244, 245, 555; 359/623, 626

(56) References Cited

U.S. PATENT DOCUMENTS

| | | | | |
|---|---|---|---|---|
| 4,826,269 A | * | 5/1989 | Streifer et al. .................. 359/19 |
| 4,893,223 A | * | 1/1990 | Arnold ......................... 362/252 |
| 5,309,277 A | * | 5/1994 | Deck ........................... 359/387 |
| 5,660,461 A | | 8/1997 | Ignatius et al. ............... 362/241 |
| 5,690,417 A | * | 11/1997 | Polidor et al. ............... 362/244 |
| 5,752,766 A | * | 5/1998 | Bailey et al. ................ 362/250 |
| 5,838,247 A | | 11/1998 | Bladowski .............. 340/815.45 |
| 5,896,093 A | * | 4/1999 | Sjobom .................. 340/815.75 |
| 6,598,994 B1 | * | 7/2003 | Tait et al. .................... 362/249 |
| 2002/0181231 A1 | * | 12/2002 | Luk ............................ 362/240 |

FOREIGN PATENT DOCUMENTS

| JP | 2001-7406 | 1/2001 |
|---|---|---|
| JP | 2002-83506 | 3/2002 |

* cited by examiner

Primary Examiner—Stephen Husar
Assistant Examiner—Hargobind S. Sawhney
(74) Attorney, Agent, or Firm—Nields & Lemack

(57) ABSTRACT

A light source system, including light emitting diodes with different light emitting colors arranged at a predetermined ratio of quantities of diodes, the ratio of quantities of diodes is determined based on light emitting status for each diode of each color so that a projected light has chromaticity of a desired color, and total quantity of the light emitting diodes is set so as to satisfy the ratio of quantities of diodes.

6 Claims, 3 Drawing Sheets

LIGHT SOURCE SYSTEM

BACKGROUND OF THE INVENTION

The present invention relates to a light source to be used in a projection system such as a projector.

As a projection system for projecting an image output from a personal computer, etc. on a screen, a light source for emitting a white light such as a xenon lamp, a high-pressure mercury-vapor lamp, etc. is used. To obtain a monochromatic light, a color filter is used to limit a transmission wavelength.

In a xenon lamp or a high-pressure mercury-vapor lamp used in the conventional light source system, power consumption is high. When it is used for long time, high heat is generated, and pooling of heat also occurs due to the cutting-off of the light. Thus, it is indispensable to cool down the system. A cooling fan is required, and a power source and electric power for the cooling fan is needed. Further, there is a problem of noise caused by the cooling fan. In order to obtain a monochromatic light, the color filter is used to cut off the light of unnecessary wavelength range. This often leads to extreme decrease of projection efficiency, and brightness on the projection screen tends to be poor.

When temperature increases, some of the electronic components may be subjected to a malfunction or damage. Further, deterioration of the component may occur.

SUMMARY OF THE INVENTION

It is an object of the present invention to provide a light source system, by which it is possible to obtain a light with desired color such as a white light by using light emitting diodes as a light source.

To attain the above object, the light source system according to the present invention comprises light emitting diodes with different light emitting colors arranged at a predetermined ratio of quantities of diodes, the ratio of quantities of diodes is determined based on light emitting status for each diode of each color so that a projected light has chromaticity of a desired color, and total quantity of the light emitting diodes is set so as to satisfy the ratio of quantities of diodes. Also, the present invention provides the light source system as described above, wherein the light emitting diodes are arranged on a spherical curved surface. Further, the present invention provides the light source system as described above, wherein the light emitting diodes are arranged on an elliptical surface of rotation or on a parabolic surface of rotation. Also, the present invention provides the light source system as described above, wherein the light emitting diodes are arranged in form of concentric and multiple circles. Further, the present invention provides the light source system as described above, wherein the concentric and multiple circles comprise circles, wherein light emitting diodes with different light emitting colors are arranged. Also, the present invention provides the light source system as described above, wherein the concentric multiple circles comprises circles, wherein light emitting diodes of the same light emitting color are arranged on each circle. Further, the present invention provides the light source system as described above, wherein light emission of the light emitting diodes is controlled for each different color. Also, the present invention provides the light source system as described above, wherein there are provided a mixer for projecting a plurality of incident monochromatic lights as a light mixed with the monochromatic lights and a light guiding means for entering the light in each of the light emitting diodes to the mixer. Further, the present invention provides the light source system as described above, wherein the light guiding means is a condenser lens corresponding to each of the light emitting diodes on 1:1 basis. Also, the present invention provides the light source system as described above, wherein there are further provided a cone-shaped light source cover for covering the light emitting diodes, the condenser lens is arranged on a curved surface concentric with a surface where the light emitting diodes are arranged, and the mixer is mounted at the vertex of the light source cover.

DETAILED DESCRIPTION OF THE PREFERRED EMBODIMENT

Figure 1:
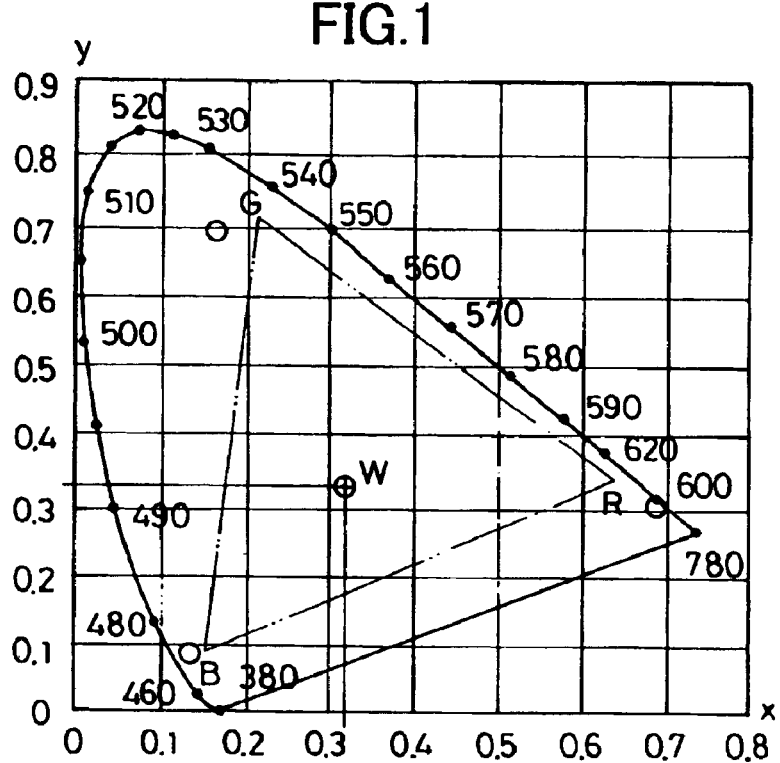
FIG. 1 is a chromaticity diagram.

Description will be given below on an embodiment of the present invention referring to the drawings.

A light emitting diode is a light emitting element, which emits only a single color of a predetermined chromaticity. In general, a red color light emitting diode, a blue color light emitting diode, and a green color light emitting diode are known.

When red color, blue color and green color are mixed together, a white light is generated. In order to generate the white light, it is essential that chromaticity of each of red color, blue color and green color must meet predetermined conditions. FIG. 1 is a chromaticity diagram. In this diagram, for instance, pure red color is represented by R, pure green color is represented by G, pure blue color is represented by B, and the white light is represented by W. Therefore, in FIG. 1, if chromaticity of a red color light emitting diode is (x:y=0.62:0.35), chromaticity of a blue color light emitting diode is (x:y=0.15:0.09), and chromaticity of green color light emitting diode is (x:y=0.22:0.71), the white light can be obtained.

In reality, however, when red light, blue light, and green light are used, which are obtained by the red color light emitting diode, the blue color light emitting diode, and the green color light emitting diode respectively, the chromaticity with the above relationship cannot be provided.

The present inventor has measured light emitting conditions such as chromaticity, brightness, etc. of each of the red color light emitting diode, the blue color light emitting diode, and the green color light emitting diode, and from the chromaticity and the brightness thus obtained, a condition to provide the condition W in the chromaticity diagram was calculated.

The condition includes a ratio of light amounts of red color, blue color and green color. Also, when the light emitting diode is specified, a light amount of the light emitting diode is determined by a light emitting condition. If the light emitting condition is the same, the light amount is proportional to the quantities of light emitting diodes. Therefore, by equalizing the ratio of quantities of the red color light emitting diodes, the blue color light emitting diodes, and the green color light emitting diodes with the ratio of the light amount calculated above, it is possible to obtain the white light, which has the red color light emitting diodes, the blue color light emitting diodes and the green color light emitting diode as light emitting elements.

Here, a concrete example of the methods to obtain the ratio of quantities of the light emitting diodes of these colors is given in a case where the following diodes are used as the red color light emitting diode, the blue color light emitting diode, and the green color light emitting diode, which are available at present:

| Red color light emitting diode (630 nm): | |
|---|---|
| Chromaticity coordinates: | (x:y = 0.7:0.3) |
| Luminous intensity (brightness): | 0.80 cd |
| Green color light emitting diode (520 nm): | |
| Chromaticity coordinates: | (x:y = 0.17:0.7) |
| Luminous intensity (brightness): | 1.00 cd |
| Blue color light emitting diode (455 nm): | |
| Chromaticity coordinates: | (x:y = 0.13:0.075) |
| Luminous intensity (brightness): | 0.30 cd |

First, chromaticity coordinates of the light emitting diodes of each of the above color are determined by the specification of each of the light emitting diodes. The chromaticity coordinates are as follows:

(1) Chromaticity of the light emitting diodes of each color:

| Red: | $x_1 = 0.70$; $y_1 = 0.300$ (position R in FIG. 1) |
|---|---|
| Green: | $x_2 = 0.17$; $y_2 = 0.700$ (position G in FIG. 1) |
| Blue: | $x_3 = 0.13$; $y_3 = 0.075$ (position B in FIG. 1) |

(2) The luminous intensity (cd) as tristimulus values is as given below. Basically, illuminance (lx) is used as unit. Here, luminous intensity (cd) is used to facilitate the explanation.

| Red: | $(X_1, Y_1, Z_1)$ | $Y_1 = 0.80$ (cd) |
|---|---|---|
| Green: | $(X_2, Y_2, Z_2)$ | $Y_2 = 1.00$ (cd) |
| Blue: | $(X_3, Y_3, Z_3)$ | $Y_3 = 0.30$ (cd) |

(3) Stimulus sum of the light emitting diode of each color is calculated.

| Red: | $S_1 = Y_1/y_1 = 0.80/0.300 = 2.667$ |
|---|---|
| Green: | $S_2 = Y_2/y_2 = 1.00/0.700 = 1.429$ |
| Blue: | $S_3 = Y_3/y_3 = 0.30/0.075 = 4.000$ |

$$X_1 = x_1 \times S_1 = 0.70 \times 2.667 = 1.867$$

$$X_2 = x_2 \times S_2 = 0.17 \times 1.429 = 0.243$$

$$X_3 = x_3 \times S_3 = 0.13 \times 4.000 = 0.520$$

$$Z_1 = (1 - x_1 - y_1) \times S_1 = (1 - 0.70 - 0.300) \times 2.667 = 0$$

$$Z_2 = (1 - x_2 - y_2) \times S_2 = (1 - 0.17 - 0.700) \times 1.429 = 0.19$$

$$Z_3 = (1 - x_3 - y_3) \times S_3 = (1 - 0.13 - 0.075) \times 4.000 = 3.18$$

(4) Based on the condition of the white light as desired, the ratio of quantities of the light emitting diodes of each color is obtained.

Here, it is assumed that the condition of the white light as desired is:

$$x_w = 0.31; \; y_w = 0.31 \; (W \text{ in FIG. 1}).$$

If it is supposed that the luminous intensity is:

$$Y_w = 100 \text{(cd)}$$

If the stimulus sum is calculated in the same manner as above, $$x_w = X_w/S_w; \; y_w = Y_w/S_w, \text{ then}$$

$$S_w = Y_w/y_w = 100/0.31 = 322.58$$

$$X_w = x_w \times S_w = 0.31 \times 322.58 = 100.00$$

$$Z_w = (1 - x_w - y_w) \times S_w = (1 - 0.31 - 0.31) \times 322.58 = 122.58$$

(5) Here, if it is assumed that the white light as desired is synthesized from emitted lights of the light emitting diodes of each color, it is required to meet the following three expressions as conditional expressions with respect to the white light:

$$X_w = (X_1 \times k_1 + X_2 \times k_2 + X_3 \times k_3) = 100.00$$

$$Y_w = (Y_1 \times k_1 + Y_2 \times k_2 + Y_3 \times k_3) = 100.00$$

$$Z_w = (Z_1 \times k_1 + Z_2 \times k_2 + Z_3 \times k_3) = 122.58$$

where k1, k2 and k3 represents quantity of the light emitting diodes of red color, green color and blue color respectively.

From the above three expressions, the following values are given to k1, k2 and k3, which represents quantity of the light emitting diodes of each color:

| Red color: | $k_1 = 36.07$ |
|---|---|
| Green color: | $k_2 = 60.78$ |
| Blue color: | $k_3 = 34.92$ |

Therefore, to obtain the white light as desired (xw=0.31, yw=0.31) having the luminous intensity of 100(cd), the necessary arrangement of the light emitting diodes of each color is:

| Red; | 36 |
|---|---|
| Green; | 61 |
| Blue; | 35. |

In fact, when the light emitting diodes of each color are arranged around an optical axis, it is possible to adjust the quantities of the light emitting diodes of each color in such extent that there is no substantial influence on a condition of an obtained luminous flux. For instance, by setting the quantity of the diodes of each color to an even number respectively, i.e. by setting the quantity of green color diode to 60 instead of 61, and blue diodes to 34 instead of 35, it is much easier to have point symmetry arrangement around the optical axis.

Therefore, to obtain the white light as desired where these light emitting diodes of each color are used, the ratio of the quantities of the light emitting diodes of each color is:

Red:green:blue=36:41:35.

If it is supposed that k1=1, it is possible to obtain such ratio of the quantities that k2=1.69 and k3=0.97. Based on this ratio of quantities, by adjusting the quantities of light emitting diodes of each color, it is possible to change the luminous intensity without changing the chromaticity conditions of the white light.

Figure 2:
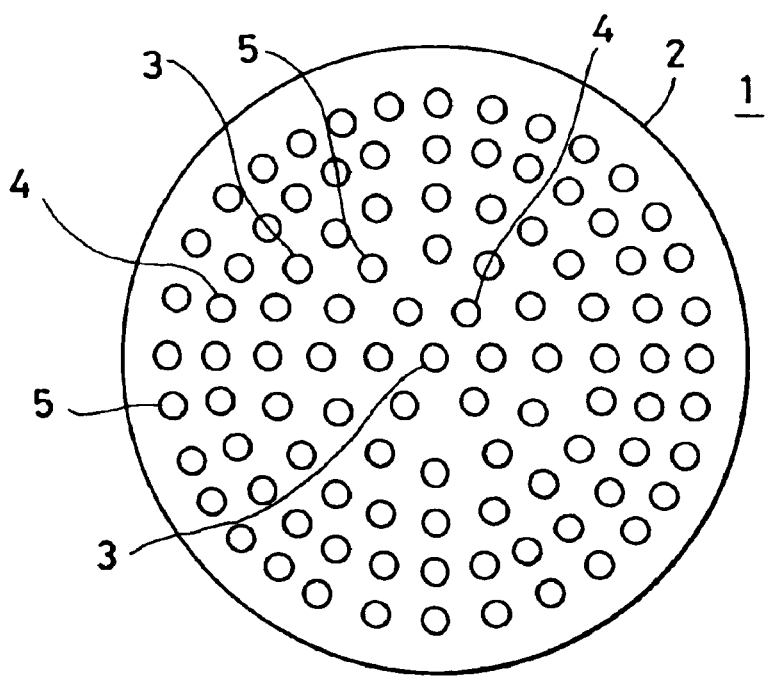
FIG. 2 is a drawing to illustrate an embodiment of the present invention.

Next, description will given on an example of the arrangement of the light emitting diodes comprised in a light source system 1 according to the present invention referring to FIG. 2.

In the light source system 1, red color light emitting diodes 3, blue color light emitting diodes 4, and green color light emitting diodes 5 are arranged in concentric and multiple form on a disk-like substrate 2.

As a method to arrange the red color light emitting diodes 3, the blue color light emitting diodes 4, and the green color light emitting diodes 5 on the substrate 2, types of the light emitting diodes are changed for each circle. In FIG. 2, the red color light emitting diodes 3 are arranged at the central portion. Then, the blue color diodes 4, the green color diodes 5, the red color diodes 3, the blue color diodes 4, and the green color diodes 5 are sequentially arranged in an outward direction in this order. Pitch of the arrangement and the quantity of the diodes arranged on each circle should be adjusted in such manner that the requirements for the quantities of diodes (i.e. 36 red color diodes, 61 green color diodes, and 35 blue color diodes) are satisfied.

The light emitting diodes may be arranged and distributed evenly over the entire surface of the substrate 2. The red color diodes 3, the blue color diodes 4 and the green color diodes 5 may be arranged at random so far as the ratio of the quantities of the light emitting diodes is (red:green:blue= 36:61:35) or it is approximately equal to this ratio when an arbitrary range is selected on the substrate 2.

Further, the substrate 2 may be designed in rectangular shape, and the light emitting diodes may be arranged in multiple rows, changing the types of the light emitting diodes for each row. Instead of concentric circles, concentric triangles or concentric polygons may be selected, and the light emitting diodes may be arranged along each side of the triangles or the polygons.

The light emitting diodes may be arranged on a recessed curved surface in form of a bowl, i.e. on an elliptical surface of rotation which is formed by rotating an ellipse around a longer diameter or around a shorter diameter of the ellipse, or on a parabolic surface of rotation which is formed by rotating a parabola around a coordinate.

By arranging the light emitting diodes on concentric circles, a cross-section of the luminous flux of the light emitted from the light source system 1 is turned to circular shape, and this facilitates subsequent optical processing such as beam-condensing, projection, etc.

When the same light emitting diodes as in the above embodiment are used and it is tried to obtain the white light with different luminous intensity, it is as given below.

The luminous intensity (cd) as tristimulus values is as follows:

| Red: | $Y_1$ = 0.80 (cd) |
|---|---|
| Green: | $Y_2$ = 1.00 (cd) |
| Blue: | $Y_3$ = 0.30 (cd) |

Here, it is assumed that the conditions for the desired white light are:

xw=0.31 and yw=0.31 (W in FIG. 1).

If it is supposed that the luminous intensity is: Yw=500 (cd), then $Sw=Yw/yw=500/0.31=1612.90$ $Xw=xw \times Sw=0.31 \times 1612.90=500.00$ $Zw=(1-xw-yw) \times Sw=(1-0.31-0.31) \times 1612.90=612.90$ If it is supposed that the desired white light is synthesized from the light emitted from the light emitting diodes of each color, then $Xw=(X1 \times k1+X2 \times k2+X3 \times k3)=500.00$ $Yw=(Y1 \times k1+Y2 \times k2+Y3 \times k3)=500.00$ $Zw=(Z1 \times k1+Z2 \times k2+Z3 \times k3)=612.90$ where k1, k2, and k3 represents quantity of the light emitting diodes of red color, green color and blue color respectively.

From the above three expressions, the following values are given to k1, k2 and k3, which represent quantity of the light emitting diodes of each color.

| Red color: | k1 = 180.35 |
|---|---|
| Green color: | k2 = 303.90 |
| Blue color: | k3 = 174.60 |

Therefore, to obtain the white light as desired (xw=0.31, yw=0.31) having the luminous intensity of 500(cd), the necessary arrangement of the light emitting diodes of each color is:

| Red: | 180 |
|---|---|
| Green: | 340 |
| Blue: | 175. |

Here, in this case, the ratio of quantities of light emitting diodes of each color is:

k1:k2:k3=1:1.69:0.97.

This is the same ratio of the quantities as the case where the luminous intensity is Yw=100(cd).

Accordingly, the ratio of the quantities of diodes as the condition for obtaining the white light of xw=0.31, yw=0.31 (W in FIG. 1), and Yw=500(cd) is [red:green:blue= 180:304:175]. Therefore, by arranging 180 red color diodes, 304 green color diodes and 175 blue color diodes, it is possible to obtain the white light as described above.

Figure 3:
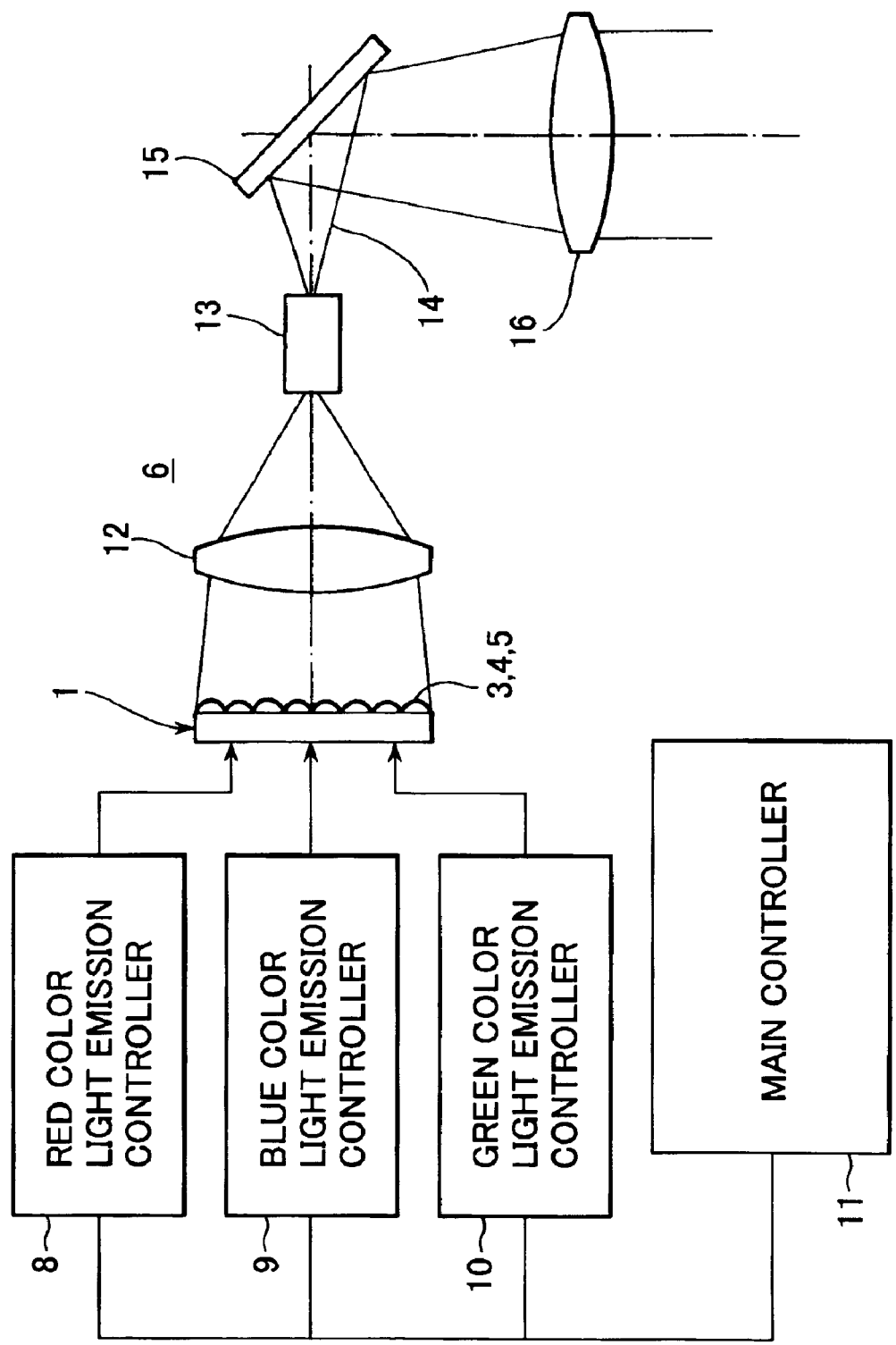
FIG. 3 is a schematical drawing of a projection system using the light source system of the present invention.

FIG. 3 shows an example of a projection system 6 which comprises the light source system 1.

In FIG. 3, on/off operation of the red color light emitting diodes 3 of the light source system 1 is controlled by a red color light emission controller 8. On/off operation of the blue color light emitting diodes 4 is controlled by a blue color light emission controller 9, and on/off operation of the green color light emitting diodes 5 is controlled by a green color light emission controller 10. On/off conditions of the red color light emission controller 8, the blue color light emission controller 9, and the green color light emission controller 10 respectively is controlled by a main controller 11.

A light beam emitted from the light source system 1 is converged by a first condenser lens 12, and the light beam enters a mixer 13. In a projection light 14 projected from the mixer 13, a red light, a blue light, and a green light are evenly mixed, and it is projected via a reflection mirror 15 and a second condenser lens 16.

The first condenser lens 12 may be designed in form of a lens array, which comprises independent lenses with each of the light emitting diodes and each of the condenser lens corresponding to each other on 1:1 basis.

For instance, when the main controller 11 turns on all of the red color light emitting diodes 3, the blue color light emitting diodes 4 and the green color light emitting diodes 5 respectively by the red color light emission controller 8, the blue color light emission controller 9 and the green color light emission controller 10, the white light can be obtained. When this white light passes through the mixer 13, an even white light can be obtained.

As the mixer 13, a kaleidoscope with light guide portion enclosed by a reflection surface may be used, or a rod prism, or an optical mixer with a plurality of fibers combined together may be used.

When the main controller 11 turns on only the red color light emitting diodes 3 by the red color light emission controller 8, a red light is projected through the second condenser lens 16.

Further, when the quantities of the turned-on diodes (red color light emitting diodes 3, the blue color light emitting diodes 4, and the green color light emitting diodes 5) are controlled, i.e. when a part of the red color light emitting diodes 3 is turned on by the red light emission controller 8, a part of the blue color light emitting diodes 5 is turned on by the blue color light emission controller 9, and a part of the green color light emitting diodes 5 is turned on by the green color light emission controller 10, it is possible to project various types of colors. By maintaining the ratio of the quantities of the diodes and by changing total quantity of the turned-on diodes, lightness of the projected light 14 can be controlled without changing the color.

When the light passes through an optical member such as a lens, absorbance varies according to a wavelength. Thus, the ratio of the quantities of the light emitting diodes may be determined by taking the absorbance into account.

When it is wanted to have a light other than the white light, the ratio of the quantities of the red color emitting diodes 3, the blue color light emitting diodes 4, and the green color light emitting diodes 5 should be determined so that the projected light 14 will have the predetermined chromaticity in the same manner as described above. Or, the light source system 1 may be designed in such manner that the light source system 1 comprises either two types of diodes selected from the red color light emitting diodes 3, the blue color light emitting diodes 4, and the green dolor light emitting diodes 5.

As described above, the projection light can be obtained by the light emitting diodes in the present embodiment, and high efficiency can be assured. When a monochromatic color or any color as desired is obtained, no color filter is used, and this means that no loss occurs in the light amount. An amount of the generated heat is low, and the cooling means such as a cooling fan, etc. can be designed in compact or there is no need to cool down.

Figure 4:
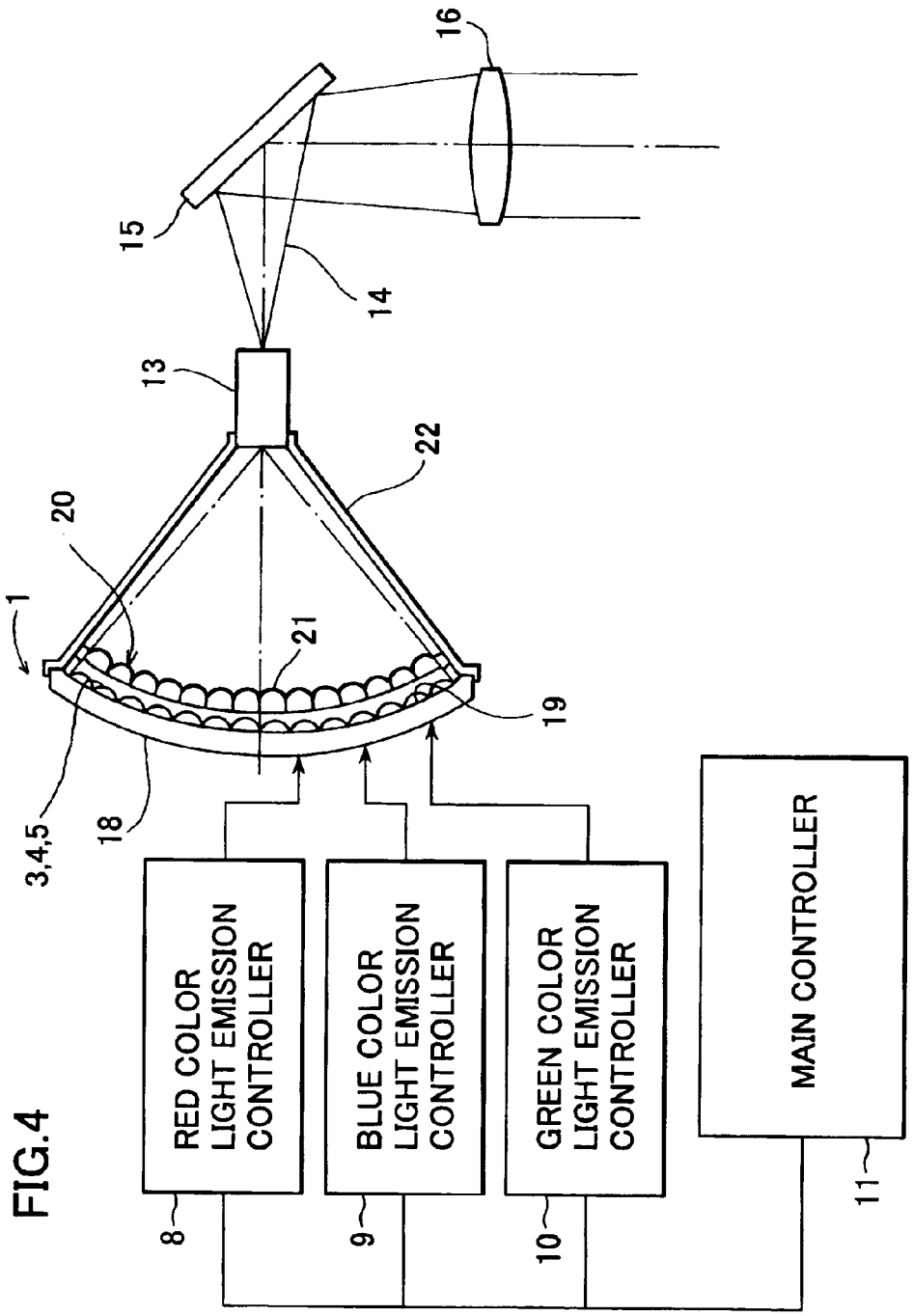
FIG. 4 is a schematical drawing of a projection system using another type of the light source system of the present invention.

FIG. 4 shows a projection system 6 comprising another type of light source system 1 according to the present invention. In FIG. 4, the same component as in FIG. 2 and FIG. 3 is referred by the same symbol, and detailed description is not given here.

As described above, the surface of the substrate 2, where the red color light emitting diodes 3, the blue color light emitting diodes 4, and the green color light emitting diodes 5 are arranged, may be designed as a recessed curved surface in form of a bowl, i.e. designed as an elliptical surface of rotation which is formed by rotating an ellipse around a longer diameter or around a shorter diameter of the ellipse, or designed as a parabolic surface of rotation which is formed by rotating a parabola around a coordinate. A substrate 18 shown in FIG. 4 has a spherical curved surface 19, and such example is shown that the red color light emitting diodes 3, the blue color light emitting diodes 4, and the green color light emitting diodes 5 are arranged in a predetermined arrangement on the spherical curved surface 19.

The red color light emitting diodes 3, the blue color light emitting diodes 4, and the green color light emitting diodes 5 are arranged in concentric and multiple form on the spherical curved surface 19. At a position opposite to the light emitting surface of the red color light emitting diodes 3, the blue color light emitting diodes 4, and the green color light emitting diodes 5, a lens unit 20 having a spherical curved surface concentric with the spherical curved surface 19 is arranged.

The lens unit 20 has lens array structure where, in the spherical curved surface, condenser lenses 21 are disposed, each of which corresponds to each of the red color light emitting diodes 3, the blue color light emitting diodes 4, and the green color light emitting diodes 5 as light guiding means on 1:1 basis.

A cone-shaped light source cover 22 is mounted on the substrate 18, and a mixer 13 is mounted on a vertex of the light source cover 22.

The condenser lens 21 is designed in such manner that each of the condenser lenses 21 independently converges the light beam from the red color light emitting diodes 3, the blue color light emitting diodes 4, and the green color light emitting diodes 5 to an incident surface of the mixer 13. In the projection light 14 projected from the mixer 13 after entering the mixer 13, a red light, a blue light, and a green light are evenly mixed, and this is projected via the reflection mirror 15 and the second condenser lens 16.

In the present embodiment, the mode of arrangement and determination of the ratio of the quantities, etc. of the red color light emitting diodes 3, the blue color light emitting diodes 4, and the green color light emitting diodes 5 are the same as in the above embodiment, and detailed description is not given here.

In the present embodiment, the red color light emitting diodes 3, the blue color light emitting diodes 4, and the green color light emitting diodes 5, the condenser lenses 21, and the mixer 13 are arranged in simple and compact manner, and it is possible to have the light source system 1 in compact design.

According to the present invention, a light source system is provided, which comprises light emitting diodes with different light emitting colors arranged at a predetermined ratio of quantities of diodes, the ratio of quantities of diodes is determined based on light emitting status for each diode of each color so that a projected light has chromaticity of a desired color, and total quantity of the light emitting diodes is set so as to satisfy the ratio of quantities of diodes. As a result, light emission efficiency is increased, and it can provide high energy-saving effects. It can be driven by the means such as battery. The amount of generated heat is low and no cooling system or no color filter is required. This contributes to simple construction and compact and lightweight design of the system. Because no fan is used, there is no noise problem, and the system can be used at a place where stillness is an important factor.

Further, the light emitting diodes are arranged in form of concentric and multiple circles. As a result, the projected luminous flux has a circular cross-section, and this facilitates subsequent optical processing.

Also, the light emission of the light emitting diodes is controlled independently for each color. As a result, the color or the lightness can be changed in simple manner without causing electric or optical loss.

What we claimed is:

1. A light source system, comprising two or more red color light emitting diodes; two or more blue color light emitting diodes; two or more green color light emitting diodes; wherein said red color emitting diodes, said blue color emitting diodes and said green color emitting diodes are arranged at a predetermined ratio of quantities of diodes on a spherical curved surface; a mixer for projecting two or more incident monochromatic lights as a light mixed with said monochromatic lights; a cone shaped light source cover for covering said light emitting diodes and for mounting said mixer at a vertex of said light source cover; and a light emission controller for controlling the number of light emitting diodes of each color that are turned on.

2. A light source system according to claim 1, wherein said spherical curved surface where said light emitting diodes are arranged at the predetermined ratio of quantities of diodes is elliptical surface of rotation or a parabolic surface of rotation.

3. A light source system according to claim 1, wherein said light emitting diodes are arranged on concentric multiple circles, wherein light emitting diodes with different light emitting colors are arranged.

4. A light source system according to claim 1, wherein said light emitting diodes are arranged on concentric multiple circles, wherein light emitting diodes of the same light emitting color are arranged on each circle.

5. A light source system according to claim 1, wherein said light emission controller controls lightness by controlling the number of diodes that are turned-on at the predetermined ratio of quantities and said light emission controller controls color by controlling the number of light emitting diodes that are turned-on.

6. A light source system according to claim 1, further comprising a lens unit which has condenser lenses, wherein each of said wherein each of said condenser lenses is opposite to each of said light emitting diodes arranged on said spherical curved surface on a 1:1 basis, and said lens unit converges light beams to said mixer.

* * * * *